(12) United States Patent
Sovoda et al.

(10) Patent No.: US 6,854,553 B2
(45) Date of Patent: Feb. 15, 2005

(54) TIRE DEFLATION DEVICE

(75) Inventors: Brent Richard Sovoda, Dearborn, MI (US); Kenneth Jerome Rottet, Troy, MI (US); Laurie Call, Beverly Hills, MI (US); Paul Culbertson, Farmington Hills, MI (US); Paul Lawrence Lipinski, Canton, MI (US); Phillip Przybylo, Williamston, MI (US); Robert Bruce, Bloomfield Hills, MI (US); Richard Moss, Saline, MI (US); Syed A Imam, Canton, MI (US); Sohail Jamal, Canton, MI (US); Tim Rush, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 10/248,474

(22) Filed: Jan. 22, 2003

(65) Prior Publication Data

US 2004/0139833 A1 Jul. 22, 2004

(51) Int. Cl.$^7$ ................................................ B06T 7/22
(52) U.S. Cl. .................................... 180/274; 280/164.1
(58) Field of Search ..................... 180/274; 280/164.1, 280/784

(56) References Cited

U.S. PATENT DOCUMENTS

| | | | |
|---|---|---|---|
| 3,794,342 A | * | 2/1974 | Froumajou et al. ......... 280/784 |
| 3,881,742 A | * | 5/1975 | Felzer ........................ 280/784 |
| 4,533,169 A | | 8/1985 | Rauthmann et al. |
| 5,275,436 A | * | 1/1994 | Pomero ...................... 280/784 |
| 5,348,113 A | | 9/1994 | Drvota et al. |
| 5,482,322 A | * | 1/1996 | Wheatley et al. ........... 280/784 |
| 5,611,568 A | * | 3/1997 | Masuda ...................... 280/784 |
| 5,911,426 A | * | 6/1999 | Yamamoto et al. ... 280/124.128 |
| 6,286,867 B1 | * | 9/2001 | Braemig et al. ............ 280/784 |
| 6,460,889 B2 | * | 10/2002 | Iyanagi et al. .............. 280/784 |

* cited by examiner

Primary Examiner—Eric Culbreth
(74) Attorney, Agent, or Firm—Gigette M. Bejin

(57) ABSTRACT

The tire deflation device (30) includes a rail member (34) having a support portion (38) and a piercing portion (44). The piercing portion (44) of the rail member (34) extends toward a tire (20) and is located between the tire (20) and a protected portion (44) of the automotive vehicle (10). The piercing portion (44) is intended to puncture and deflate the tire (20) when a crush zone (18) is deformed inwardly so as to force the tire (20) into the piercing portion (44) of the rail member (34). The support portion (38) has at least one anchor member (32) fixedly attached thereto for securely mounting the rail member (34) to a side mount (12) of the automotive vehicle (10) within a middle rigid zone (14) thereof.

20 Claims, 4 Drawing Sheets

TIRE DEFLATION DEVICE

BACKGROUND OF INVENTION

The present invention relates generally to automotive vehicles, and more particularly to a tire deflation device for reducing wheel intrusion into vehicular body structures.

High-speed frontal offset impacts experienced by automotive vehicles are known to force front wheels inward so as to cause intrusions into vehicular body structures.

The intrusions typically damage the vehicle rockers, the toe pans, and various other vehicular components. The intrusions may also lead to the entrapment of the driver and other occupants within the vehicle. Additionally, the front seat passengers may suffer injuries in these types of collisions including extensive bone fractures within the legs and the pelvis.

One proposed solution for addressing this concern employs a deflecting wedge. Typically, the deflecting wedge is fixedly attached to a wall of a wheel arch adjacent to a passenger cabin. In the event of a collision where the wheel is forced towards the passenger cabin, the deflecting member may engage the wheel so as to direct the movement thereof laterally outward from the vehicle and away from the passenger cabin.

The outward deflection of the wheel may require the deformation of various mechanisms attached to the wheel. These mechanisms may include the axle, the suspension, and a variety of other vehicular components. Unfortunately, the stiffness of these mechanisms may oppose the outward deflection of the wheel. Consequently, the wheel may impart a substantial amount of force on the deflecting wedge before the mechanisms deform and allow deflection of the wheel. Thus, significant force may still be transferred to the passenger cabin through the deflecting wedge before deflection actually occurs. Such a result is clearly undesirable.

Further, attaching the deflecting wedge to a wall within the front impact region of the vehicle may decrease or even negate the effectiveness of the wedge if the wall is deformed before the tire contacts the wedge. For example, a high-speed impact may sufficiently deform the wall so as to position the deflecting wedge beyond the path of an intruding wheel. Moreover, the wall may be deformed such that a surface of the deflecting member is positioned perpendicular to the path of the intruding wheel. In this regard, the deflecting member itself may be forced towards the passenger cabin. Of course, the deflecting member may be disposed in a variety of other positions where its effectiveness is significantly decreased.

Another proposed solution discloses a destruction member fixedly attached to a portion of the passenger cabin behind a tire. The destruction member may be a spike, a cutting edge, a punch, or various other mechanisms used for puncturing a tire. A puncturable cover or a wheel arch guard typically conceals the destruction member.

Unfortunately, attaching the destruction member only to the portion of the passenger cabin behind the wheel may fail to provide a secure attachment for the destruction member. A limited portion of the passenger cabin is available for the destruction member to be mounted thereto. Inadequate support may cause the destruction member to become dislodged from the vehicle during a collision before puncture of the tire may occur.

Moreover, similar to the deflecting wedge, the attachment of the destruction member within the front impact region may decrease or even negate the effectiveness of the destruction member if the passenger cabin is sufficiently deformed before contact is made between the tire and the destruction member. For example, slight deformation of the passenger cabin may orient the destruction member away from the tire so as to prevent the destruction member from puncturing the tire. Alternatively, the passenger cabin may be sufficiently deformed so as to position the destruction member entirely beyond the path of the intruding wheel.

Furthermore, the destruction members may add complexity to the assembly of vehicles and consequently prevent practical aftermarket integration therein. The least unstable attachment of the destruction members within the front impact region may require fusion welding of each destruction member thereto. Thereafter, a puncturable cover is coupled to the vehicle for concealing the destruction member. These extensive manufacturing requirements are clearly unfavorable and relatively expensive.

Therefore, it would be desirable to provide a tire deflation device that can be properly secured to an automotive vehicle so as to efficiently mitigate wheel intrusion and allow for simple aftermarket integration within the vehicle.

SUMMARY OF INVENTION

The present invention reduces wheel intrusion into vehicular body structures. In carrying out the present invention, a tire deflation device is securely attached to the automotive vehicle for providing reliable puncture of a tire being forced into a vehicular body structure.

The tire deflation device includes a rail member having a support portion and a piercing portion. The piercing portion of the rail member extends toward a tire and is located between the tire and a protected portion of the automotive vehicle. The piercing portion is intended to puncture and deflate the tire when a crush zone is deformed inwardly so as to force the tire into the piercing portion of the rail member. The support portion has at least one anchor member fixedly attached thereto for securely mounting the rail member to a side mount of the automotive vehicle within a middle rigid zone thereof.

One advantage of the present invention is that the attachment to the automotive vehicle allows for the proper positioning of a piercing device despite the deformation of a crush zone. Another advantage of the present invention is that the improved attachment strengthens the support provided to a piercing device so as to allow for the reliable puncture of an intruding tire. Still yet another advantage of the present invention is the ready aftermarket incorporation of the tire deflation within the automotive vehicle.

Other advantages of the present invention will become apparent when viewed in light of the detailed description of the preferred embodiment when taken in conjunction with the attached drawings and appended claims.

BRIEF DESCRIPTION OF DRAWINGS

For a more complete understanding of this invention, reference should now be made to the embodiments illustrated in greater detail in the accompanying drawings and described below by way of examples of the invention.

DETAILED DESCRIPTION

Figure 1:
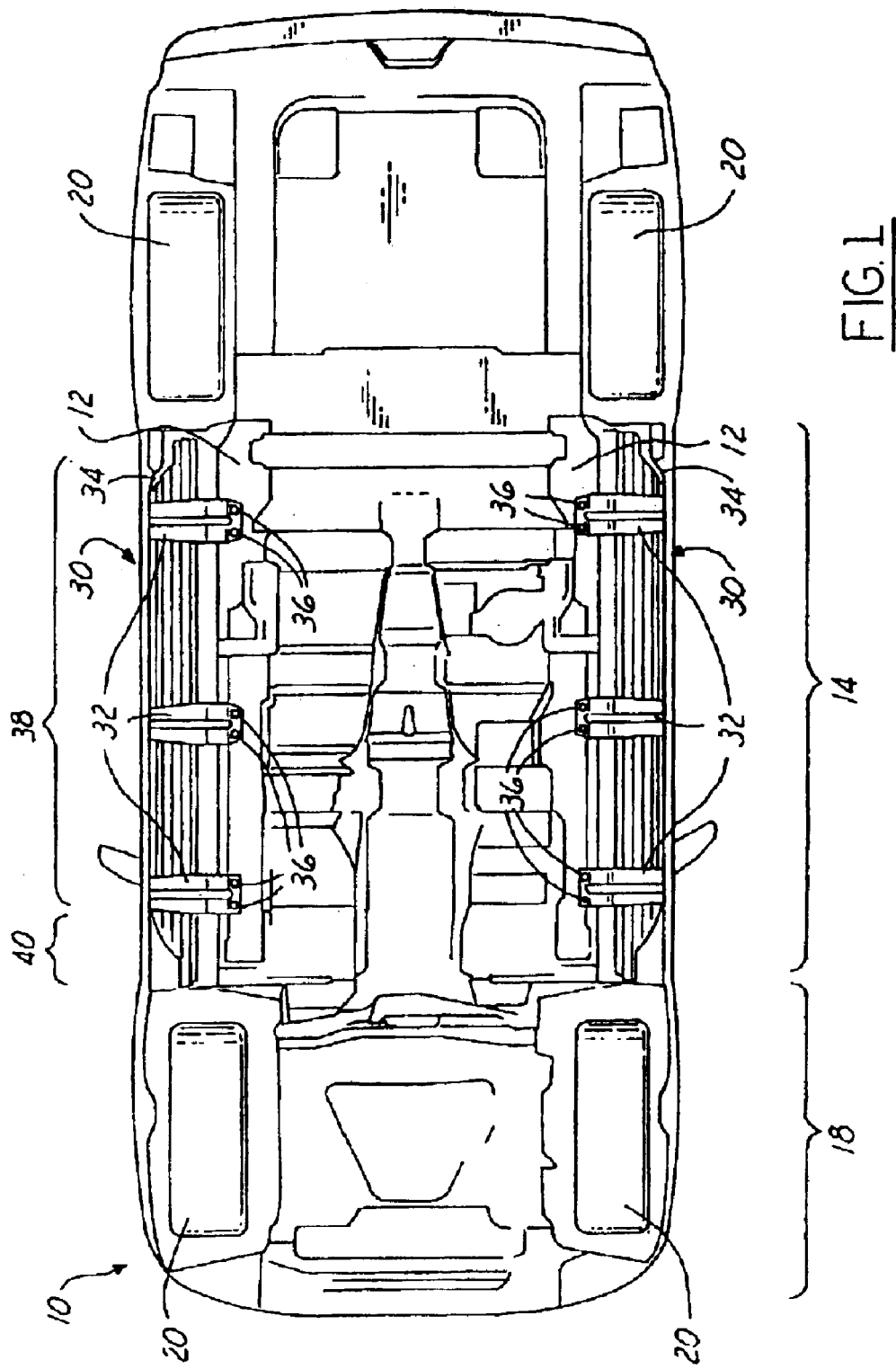
FIG. 1 is a bottom plan view of a tire deflation device incorporated within an automotive vehicle according to a preferred embodiment of the present invention.

In the following figures, the same reference numerals are used to identify the same components in the various views.

Figure 2:
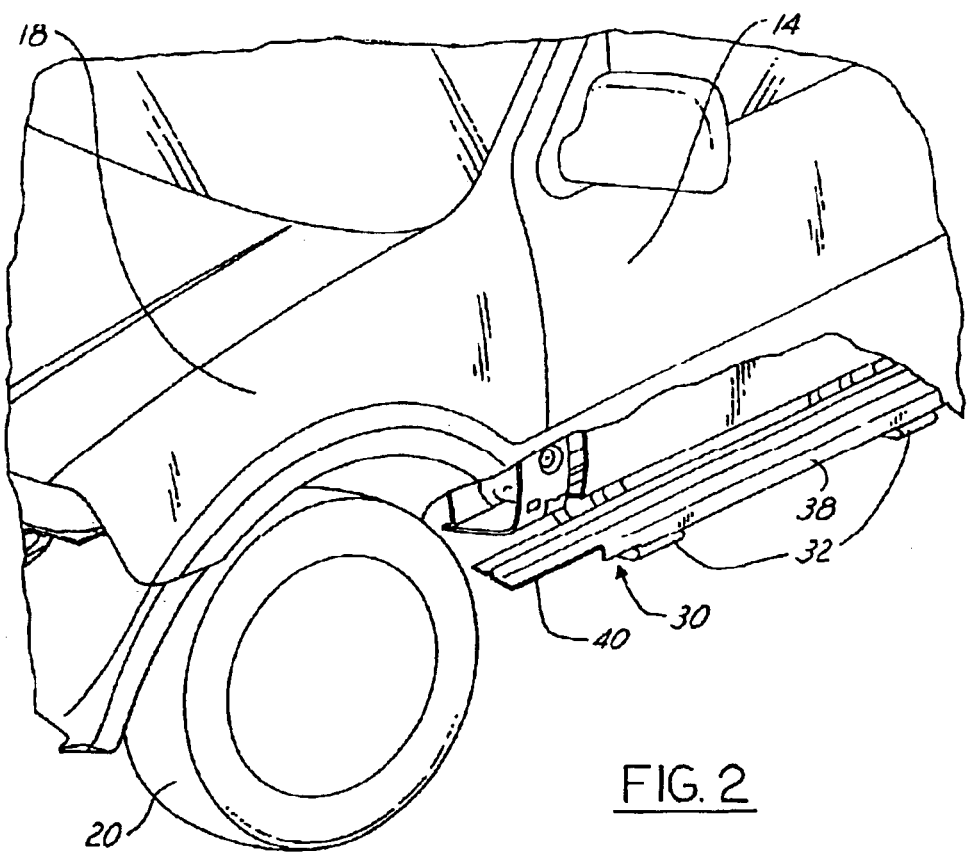
FIG. 2 is a partially cutaway perspective view of an automotive vehicle having a tire deflation device incorporated therein according to a preferred embodiment of the present invention.

FIGS. 1 and 2 generally show an automotive vehicle 10 having a pair of tire deflation devices 30 according to a preferred embodiment of the present invention. FIG. 1 illustrates a bottom plan view of the automotive vehicle 10. FIG. 2 shows a partially cutaway perspective view of the automotive vehicle 10 shown in FIG. 1.

The tire deflation device 30 preferably includes a plurality of anchor members 32 fixedly coupled to a side mount 12 of the automotive vehicle 10 within a middle rigid zone 14 thereof.

The middle rigid zone 14 typically includes a protected portion 16 having sufficient stiffness for reducing deformation and intrusion experienced during a vehicular collision. As is widely known in the art, the protected portion 16 most commonly requiring fortification is a passenger cabin. Sufficient stiffness of the middle rigid zone 14 reduces deformation thereof and intrusion therein so as to improve the safety of passengers within the vehicle 10.

On the other hand, a crush zone 18 is typically designed to deform so as to absorb kinetic energy during a vehicular collision. The crush zone 18 usually is a front impact region or a rear impact region of the vehicle 10. Thus, vehicular components within the crush zone 18 typically are subjected to deformation during high speed impacts.

The side mount 12 is integrated within the middle rigid zone 14 of the automotive vehicle 10. Consequently, the side mount 12 typically has more stiffness than vehicular components within the crush zone 18. Moreover, front impacts and rear impacts typically impart lesser forces on the side mount 12 than they do to vehicular components mounted within or directly adjacent to the crush zone 18.

Preferably, the side mount 12 for attachment of the tire deflation device 30 thereon is a vehicle rocker. However, the side mount 12 may be various other suitable vehicular components as desired.

Each tire deflation device 30 preferably employs three anchor members 32 for securely attaching a rail member 34 to the side mount 12 without adding undesirable weight to the vehicle 10. In particular, these anchor members 32 preferably are integrally formed within the rail member 34 and extend therefrom for attaching to the side mount 12. The anchor members 32 are positioned relative to each other on the side mount 12 so as to provide optimal support for the tire deflation device 30 during a vehicular collision. This may be accomplished by evenly distributing the anchor members 32 across the entire length of the side mount 12. Of course, more or less anchor members 32 may be utilized and their placement may vary as well.

The tire deflation device 30 may also employ various other forms of the anchor member 32 as desired. For example, the anchor member 32 may be a single continuous ledge that is nearly equal in length to the side mount 12 and attached thereto across the entire length thereof.

The preferred anchor member 32 employs bolt fasteners 36 for attaching to the side mount 12 of the automotive vehicle 10. A typical bolt fastener may be a self-piercing rivet. As is known in the art, the use of bolt fasteners 36 may reduce the manufacturing cycle time of the automotive vehicle 10. Further, the bolt fasteners 36 allow for ready aftermarket integration of the tire deflation device 30 within the automotive vehicle 10. In contrast to fusion welding and various other fastening mechanisms, the bolt fasteners 36 allow for easy assembly and attachment to the vehicle 10. However, various other kinds of fasteners may also be used as desired.

The anchor members 32 have a rail member 34 fixedly attached thereto. Preferably, fusion welding is used to attach a support portion 38 of the rail member 34 to the anchor members 32. Fusion welding 34 provides a firm bond between the anchor members 32 and the rail member 34. Moreover, this for of attachment simplifies integration of the tire deflation device 30 within the vehicle 10 during both production of the vehicle 10 and aftermarket integration of the device 30 therein. Alternatively, a variety of other fasteners may be used.

The rail member 34 preferably is a running board reinforcement for an automotive vehicle 10. Further, the rail member 34 preferably is a single-piece roll formed section of metal. Naturally, the rail member 34 may constitute various other vehicular components and may be manufactured by other methods as desired.

The rail member 34 includes the support portion 38 and a piercing portion 40. The support portion 38 is operatively coupled to the side mount 12 within the middle rigid zone 14 of the automotive vehicle 10. The support portion 38 has a piercing portion 40 extending therefrom toward a tire 20 so as to place the piercing portion 40 between the tire 20 and the protected portion 16 of the automotive vehicle 10.

Figure 3:
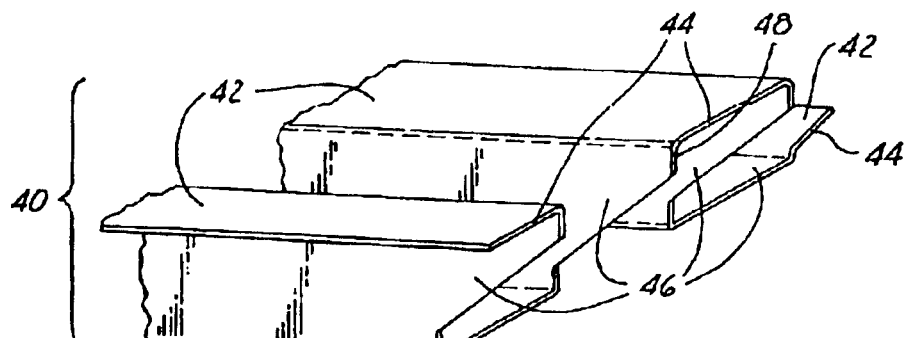
FIG. 3 is a partially cutaway perspective view of a piercing portion of a rail member according to a preferred embodiment of the present invention.

Turning now to FIG. 3, there is illustrated a perspective view of a piercing portion of the rail member 34 according to a preferred embodiment of the present invention. The piercing portion 40 includes a cutting wall 42 having a cutting edge 44 integrally formed therein. Preferably, the piercing portion 40 includes three cutting walls 42 each having a cutting edge 44 integrally formed therein. The cutting edges 44 are sufficiently sharp so as to puncture a tire 20. The cutting edge 44 may also be a sharp corner, a barb, a spike, or various other cutting members integrally formed within the piercing portion 40 as desired.

Each cutting wall 42 and each cutting edge 44 are sufficiently supported by at least one reinforcement wall 46 extending therefrom without adding undesirable weight to the rail member 34. The reinforcement wall 46 preferably extends into a plane other than the one in which the cutting wall 42 is disposed. Thus, the reinforcement wall 46 strengthens the piercing portion 40 against forces exerted thereon by an intruding tire 20. For example, a piercing portion 40 having a cutting wall 42 disposed in a horizontal plane most efficiently opposes deformation in a vertical direction if the cutting wall 42 is supported by a reinforcement wall 46 disposed in a vertical plane.

Further, as is known in the art, greater support is typically provided if the reinforcement wall 46 is larger in size. Therefore, the size and the orientation of the reinforcement walls 46 are provided in order to allow for optimal support against forces received from various directions without significantly increasing the weight of the rail member 34.

Each cutting edge 44 has at least one dull edge 48 adjacently coupled thereto for mitigating accidental harm experienced by individuals handling the rail member 34. The dull edge 48 is oriented and sized for obstructing unintended harm caused by the cutting edge 44 while still allowing puncture of a tire 20 thrusted thereon during a vehicular collision. The dull edge 48 preferably is about 2 millimeters in length and formed within a portion of the reinforcement wall 46 adjacent to the cutting edge 44. Of course, the dull edge 48 may be oriented and sized otherwise as desired.

Figure 4A:
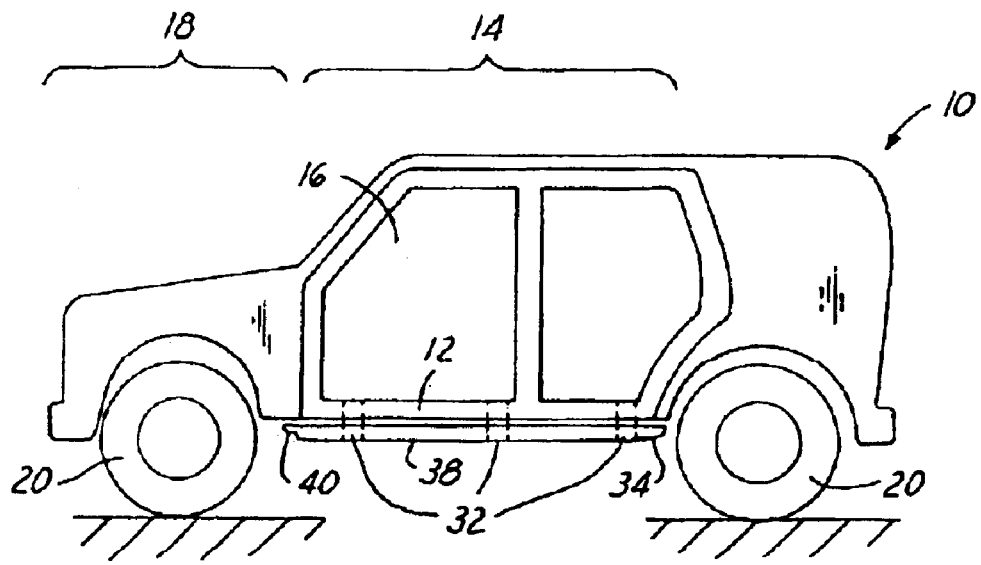
FIG. 4A is a side view of an automotive vehicle with a tire deflation device integrated therein, according to a preferred embodiment of the present invention.
Figure 4B:
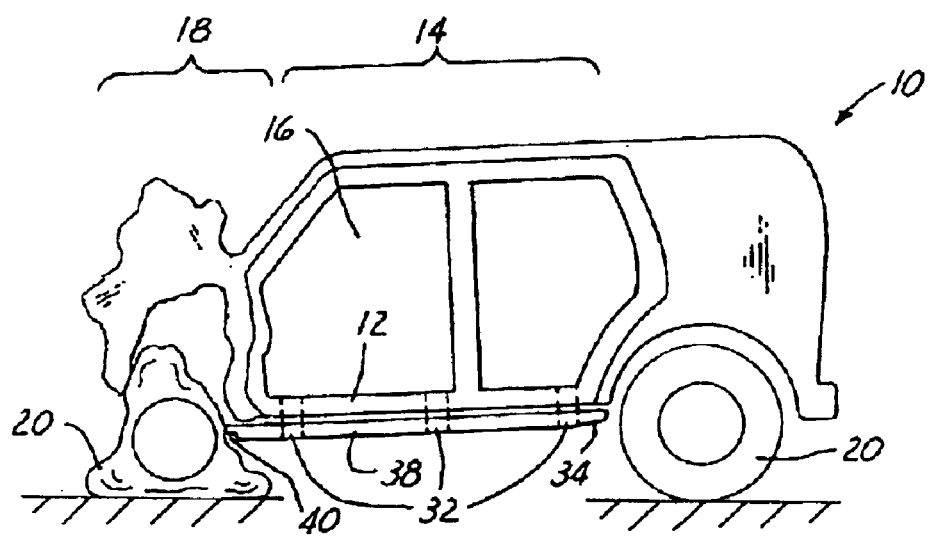
FIG. 4B is a side view of the automotive vehicle shown in FIG. 4A after a high-speed front offset impact, according to a preferred embodiment of the present invention.

FIGS. 4A and 4B are diagrammatic representations showing the tire deflation device 30 in operation according to a preferred embodiment of the present invention. FIG. 4A is a side view of an automotive vehicle 10 with a tire deflation device 30 integrated therein, according to a preferred embodiment of the present invention. FIG. 4B is a side view of the automotive vehicle shown in FIG. 4A after a high-speed frontal offset impact.

A high-speed frontal offset impact may deform the crush zone 18 inwardly thereby forcing the front tire rearward toward the protected portion 16. The impact may cause serious deformation of the front impact region and even slight initial deformation of the protected portion 16 before the piercing portion 40 of the rail member 34 punctures and deflates the tire 20. Despite the deformation of the vehicle 10, the tire deflation device 30 remains securely attached to the vehicle 10 and properly positioned in order to puncture and deflate the tire 20.

The anchor members 32 are sufficiently remote from the deformed portions of the vehicle 10 so as to maintain proper orientation of the tire deflation device 30 for puncturing the tire 20. Further, the number of anchor members 32 and the attachment thereof across the rigid side mount 12 provide stable support for allowing the tire deflation device 30 to puncture the intruding tire 20.

As a person skilled in the art will understand, the tire deflation device 30 may have the similar elements described in the preferred embodiment yet compose more or less individual parts. For example, an alternative embodiment of the tire deflation device 30 may require a single rail member 34 having a support portion 38, a piercing portion 40, and at least one anchor portion 32 each integrally formed therein and extending therefrom. Also, another embodiment of the tire deflation apparatus 30 may require a rail member 34 having a separate piercing member 40 attached thereto.

Figure 5:
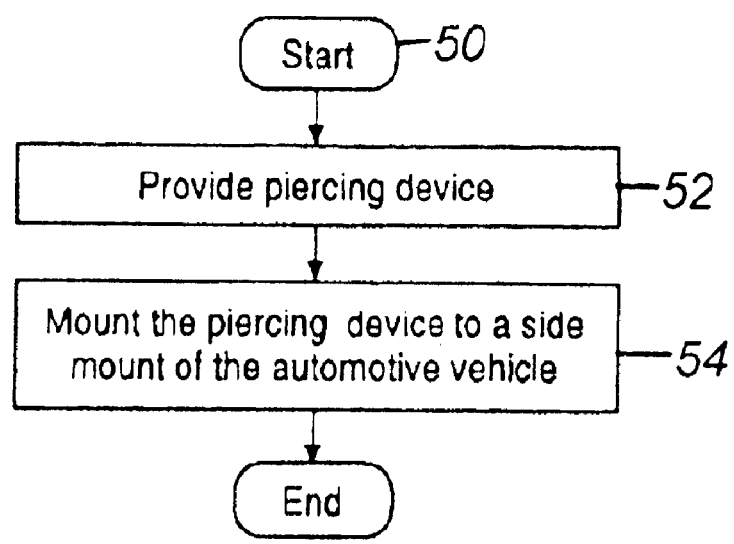
FIG. 5 is a flowchart illustrating a method for equipping an automotive vehicle with a piercing device for puncturing a tire in the event of a vehicular collision, according to a preferred embodiment of the present invention.

Referring now to FIG. 5, a flowchart illustrates a method for equipping an automotive vehicle 10 with a piercing device for puncturing a tire in the event of a vehicular collision, according to a preferred embodiment of the present invention. The method is initiated in step 50 and then immediately proceeds to step 52.

In step 52, a piercing device is provided. Preferably, the piercing device is the tire deflation device 30 as detailed in the descriptions for FIGS. 1–4B. The rail member 34 preferably is a roll formed section. Further, an end of the rail member is cut at an angle for providing a cutting edge 44 sufficient to puncture a tire forced thereon. Alternative piercing devices may be used as desired. Then, the sequence proceeds to step 54.

In step 54, the piercing device is attached to a side mount 12 integrated within a middle rigid zone 14 of the automotive vehicle 10. Mounting the piercing device within the middle rigid zone reduces the likelihood that the piercing device may be misaligned during a vehicular collision. Consequently, the piercing device is properly secured to the automotive vehicle 10 that such it can effectively puncture an intruding tire.

While particular embodiments of the invention have been shown and described, numerous variations and alternate embodiments will occur to those skilled in the art. Accordingly, it is intended that the invention be limited only in terms of the appended claims.

What is claimed is:

1. A tire deflation device for an automotive vehicle, the tire deflation device comprising:

a rail member having a support portion and a piercing portion, said piercing portion intended to be positioned adjacent to a tire between said tire and a protected portion of the automotive vehicle, said piercing portion intended to puncture and deflate said tire when a crush zone is deformed inwardly so as to force said tire into said piercing portion of said rail member; and at least one anchor member extending from said support portion of said rail member, said at least one anchor member fixedly coupling said support portion of said rail member to a side mount of said automotive vehicle within a middle rigid zone thereof, said middle rigid zone being located inward from said crush zone.

2. The tire deflation device as recited in claim 1 wherein said piercing portion has at least one cutting wall terminating at an end with at least one cutting edge.

3. The tire deflation device as recited in claim 2 wherein said at least one cutting wall and said at least one cutting edge are reinforced by at least one reinforcement wall extending therefrom.

4. The tire deflation device as recited in claim 2 wherein said at least one cutting edge has at least one dull edge adjacently coupled thereto for preventing an undesired cutting by said at least one cutting edge thereby improving a safety in handling of said rail member.

5. The tire deflation device as recited in claim 4 wherein at least one dull edge is integrally formed within said at least one reinforcement wall.

6. The tire deflation device as recited in claim 1 wherein said support portion of said rail member comprises a running board reinforcement for the automotive vehicle.

7. The tire deflation device as recited in claim 1 wherein said protected portion is a passenger cabin of the automotive vehicle.

8. The tire deflation device as recited in claim 1 wherein said crush zone is at least one of a front impact region and a rear impact region of the automotive vehicle.

9. The tire deflation device as recited in claim 1 wherein said side mount is a rocker integrated within the automotive vehicle.

10. The tire deflation device as recited in claim 1 wherein a plurality of bolts is employed for attaching said at least one anchor member to said side mount.

11. A tire deflation device for an automotive vehicle comprising:

at least one anchor member fixedly coupled to a side mount of an automotive vehicle within a middle rigid zone thereof;

a support rail member fixedly coupled to said at least one anchor member; and a piercing member fixedly coupled to an end of said support rail member and extending therefrom toward a tire, said piercing member being located between said tire and a protected portion of said automotive vehicle, said piercing member puncturing and deflating said tire when said front impact region is crushed inwardly forcing said tire toward said protected portion.

12. The tire deflation device as recited in claim 11 wherein said piercing member is integrally formed within said support rail member and extends therefrom.

13. The tire deflation device as recited in claim 11 wherein said piercing member has at least one cutting edge integrally formed within at least one cutting wall.

14. The tire deflation device as recited in claim 13 wherein said at least one cutting wall and said at least one cutting edge are reinforced by at least one reinforcement wall extending therefrom.

15. The tire deflation device as recited in claim 13 wherein said at least one cutting edge has at least one dull edge adjacently coupled thereto for preventing an undesired cutting by said at least one cutting edge thereby improving safety in handling of said rail member.

16. The tire deflation device as recited in claim 15 wherein said at least one dull edge is integrally formed within said at least one reinforcement wall.

17. The tire deflation device as recited in claim 11 wherein said protected portion is a passenger cabin of the automotive vehicle.

18. The tire deflation device as recited in claim 11 wherein a crush zone is at least one of a front impact region and a rear impact region of the automotive vehicle.

19. A method for equipping an automotive vehicle with a tire deflation device for puncturing a tire in the event of a collision, the method comprising:

providing a piercing device; and attaching said piercing device to a side mount integrated within a middle rigid zone of the automotive vehicle.

20. The method as recited in claim 19 wherein the step of providing said piercing device comprises:

roll forming a rail member having a cutting wall; and forming a cutting edge on said cutting wall.

* * * * *